United States Patent [19]

Kowalski

[11] 4,305,557

[45] Dec. 15, 1981

[54] PIPE HANGER

[75] Inventor: Joseph W. Kowalski, Florissant, Mo.

[73] Assignee: B-Line Systems, Inc., Highland, Ill.

[21] Appl. No.: 129,563

[22] Filed: Mar. 12, 1980

[51] Int. Cl.³ ............................................. E21F 17/02
[52] U.S. Cl. ...................................... 248/62; 248/59; 248/327
[58] Field of Search ...................... 248/62, 59, 58, 60, 248/327, 317; 24/23 B

[56] References Cited

U.S. PATENT DOCUMENTS

| 1,579,418 | 4/1926 | Tomkinson | 248/62 X |
| 2,762,598 | 9/1956 | Runge | 248/59 X |
| 2,936,991 | 5/1960 | Picha et al. | 248/59 X |
| 2,944,778 | 7/1960 | Katis | 248/62 |
| 2,996,274 | 8/1961 | Marik et al. | 248/62 |
| 3,261,580 | 7/1966 | Schauster | 248/62 |

FOREIGN PATENT DOCUMENTS 2309664  9/1973  Fed. Rep. of Germany ........ 248/59

Primary Examiner—J. Franklin Foss
Attorney, Agent, or Firm—Senniger, Powers, Leavitt and Roedel

[57] ABSTRACT

A hanger for attachment to a vertically disposed threaded support rod or the like for supporting a pipe or the like in generally horizontal position. The hanger comprises a support member of relatively resilient material which engages the undersurface of the pipe and which has a pair of legs extending upwardly at opposite sides of the pipe. The upper ends of the legs are bent laterally inwardly toward one another to form upper and lower generally horizontal overlapping flanges which overlie the pipe, each flange having an opening therein for receiving the support rod therethrough. A nut is held captive but rotatable with respect to the support member adjacent these flanges, the nut having a threaded hole generally in register with the opening in one of the flanges. The legs of the support member are sprung together from an initial position in which the upper ends of the legs are spaced relatively far apart for application of the hanger to the pipe, to a final position in which the upper ends of the legs are held relatively close together with the flange openings in register for receiving the support rod therethrough whereby the nut may be threaded onto the support rod for attachment of the hanger to the rod.

29 Claims, 9 Drawing Figures

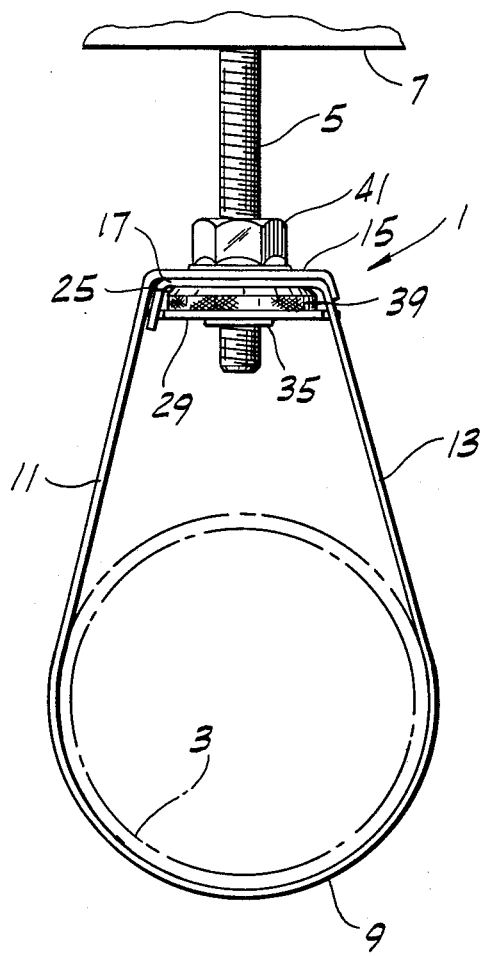
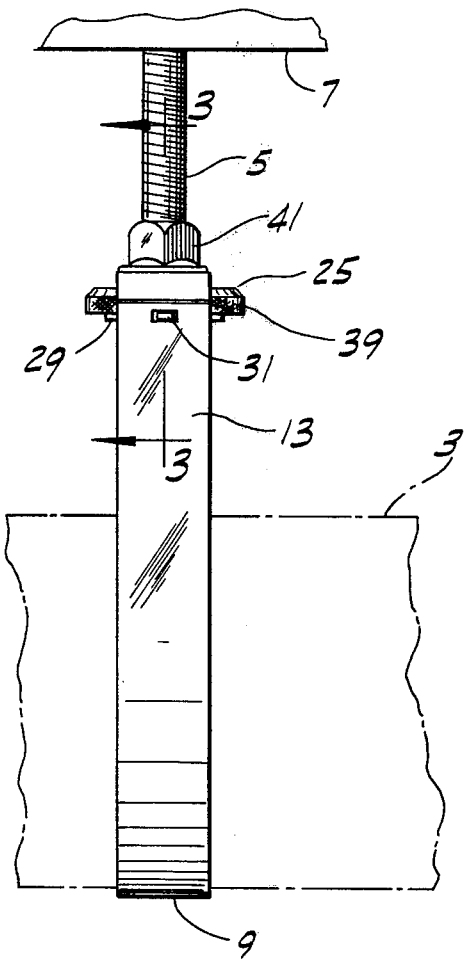
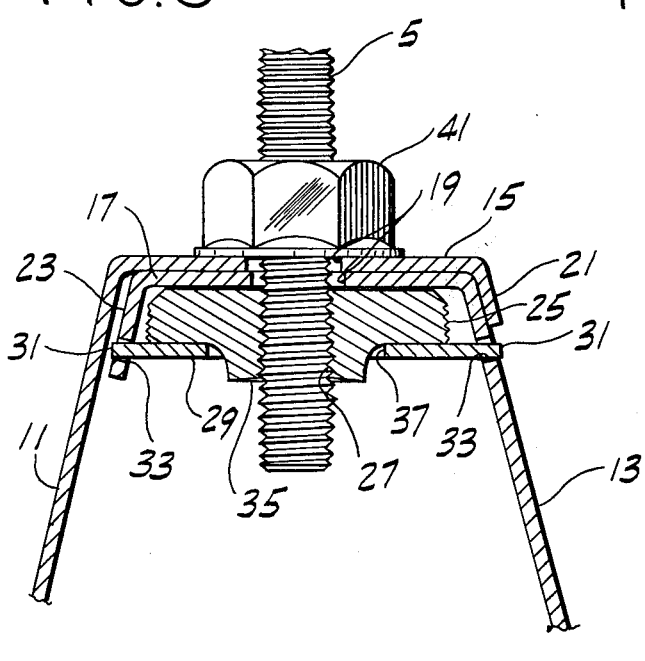
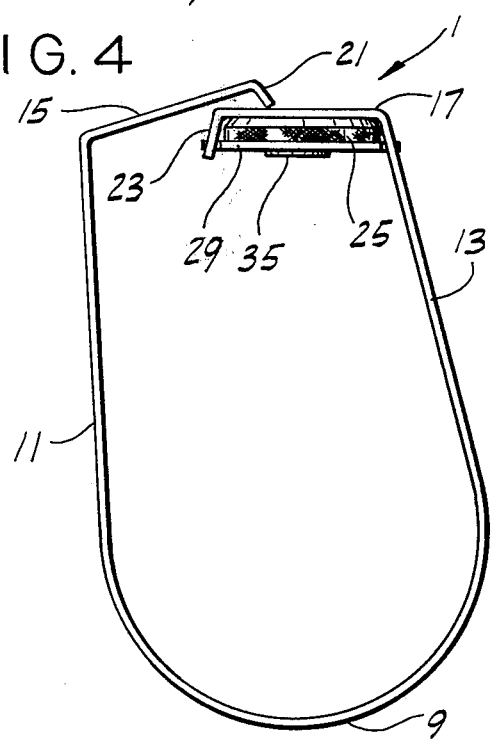

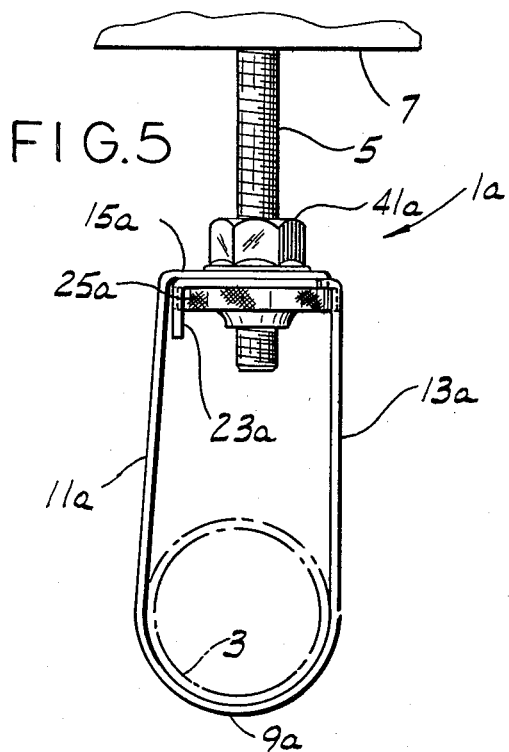
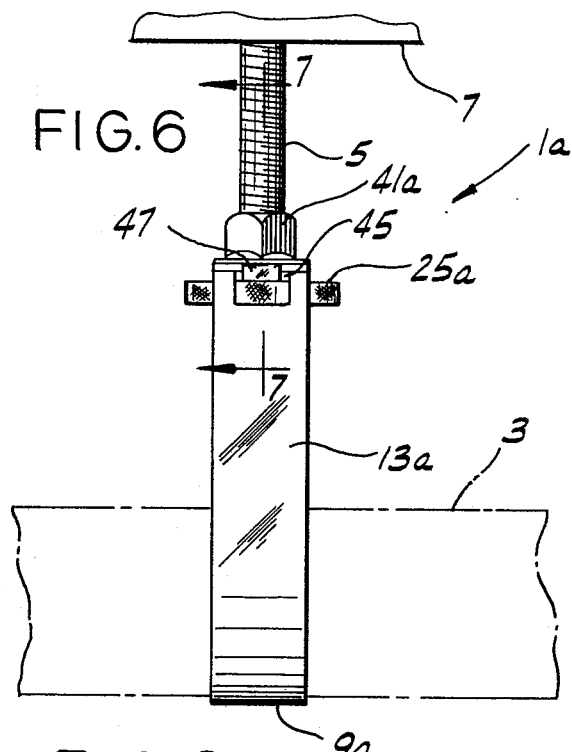
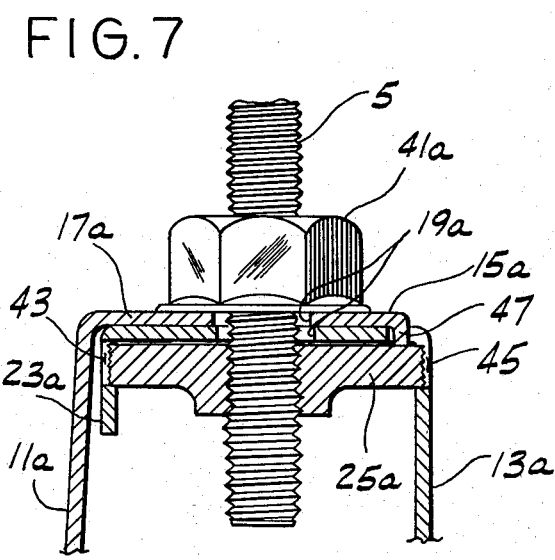
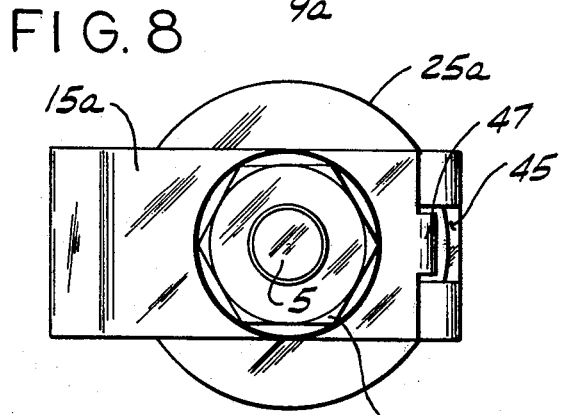
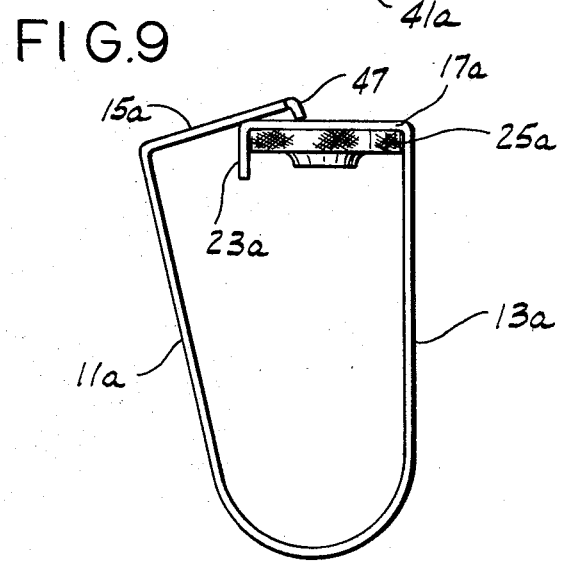

PIPE HANGER

BACKGROUND OF THE INVENTION

This invention relates generally to a pipe and conduit hanger of the type adapted to be attached to a threaded support rod depending vertically from a structural steel beam, for example, and more particularly to such a hanger which is vertically adjustable on the support rod for supporting a pipe or conduit in generally horizontal position at a selected elevation.

One such pipe hanger presently on the market comprises a generally U-shaped metal strap, the upper ends of which are bent inwardly to form overlapping horizontal flanges. The hanger also includes a separate metal insert having a circular head and a shank extending up through aligned holes in the flanges of the metal strap. The shank of the insert is internally threaded to receive an externally threaded stud or support rod. The elevation of the hanger is adjustable by threading the insert up and down on the stud.

This prior art hanger has a serious drawback, however, in that the strap and the insert are two separate unconnected parts which tend to become separated during shipment and during handling in the field. Moreover, installation of the hanger is made more difficult due to the fact that two separate pieces must be handled. In addition, this prior art hanger in general, and the insert in particular, are relatively expensive to produce.

The prior art hanger shown and described in U.S. Pat. No. 2,996,274 is similar to the hanger described above, except that the metal insert is formed to be held captive (but also rotatable) in the opening in the lower flange of the U-shaped strap, thereby avoiding the problem of the strap and insert becoming separated. However, this insert is even more expensive to produce. Moreover, attachment of the hanger to a support rod may be inconvenient in that, according to the specification of the patent, the legs of the U-shaped strap must be squeezed together to bring the flange holes into alignment, and the legs then manually held in that position while the insert is moved to a position in which it may be threaded onto a support rod.

U.S. Pat. No. 1,579,419 shows another pipe hanger generally in the field of this invention.

SUMMARY OF THE INVENTION

Among the several objects of this invention may be noted the provision of an improved pipe hanger of the type described above; the provision of such a hanger which is relatively inexpensive to manufacture; the provision of such a hanger having component parts which cannot become separated; and the provision of such a hanger which may quickly and easily be attached to a support rod with minimum effort.

Generally a hanger of this invention is adapted to be attached to a vertically disposed threaded support rod or the like for supporting a pipe or the like in generally horizontal position. In a first aspect, the hanger comprises a support member of relatively resilient material engageable with the undersurface of the pipe and having a pair of legs adapted to extend upwardly at opposite sides of the pipe. The upper ends of the legs are bent laterally inwardly toward one another to form upper and lower generally horizontal overlapping flanges which overlie the pipe, each flange having an opening therein for receiving the support rod therethrough. A nut is held captive but rotatable with respect to the support member adjacent these flanges, the nut having a threaded hole therethrough generally in register with the opening in one of the flanges. The legs of the support member are adapted to be sprung together from an initial position in which the upper ends of the legs are spaced relatively far apart for application of the hanger to the pipe, to a final position in which the upper ends of each leg are closer together and the flange openings are in register for receiving said support rod therethrough. Means are provided for holding the legs in said final position when the legs are sprung together whereby said nut may be threaded onto the support rod for attachment of the hanger to the rod and for enabling vertical adjustment of the hanger on the rod.

In a second aspect, the hanger comprises a support member engageable with the undersurface of the pipe and having a pair of legs adapted to extend upwardly at opposite sides of the pipe. The upper ends of the legs are bent laterally inwardly toward one another to form upper and lower generally horizontal overlapping flanges adapted to overlie the pipe, each flange having an opening therein for receiving the support rod therethrough. A relatively thin flat nut is held captive but rotatable with respect to the support member below these flanges, the nut having a threaded hole therethrough generally in register with the opening in one of said flanges. The legs of the support member are adapted to be moved together from an initial position in which the upper ends of the legs are spaced relatively far apart for application of the hanger to the pipe, to a final position in which the upper ends of each leg are closer together and said flange openings are in register for receiving the support rod therethrough. Means are provided for maintaining the legs in their final position when the legs are moved together whereby the nut may be threaded onto said support rod for attachment of the hanger to the rod and for enabling vertical adjustment of the hanger on the rod.

Other objects and features will be in part apparent and in part pointed out hereinafter.

BRIEF DESCRIPTION OF THE DRAWINGS

FIG. 1 is a front elevation of a hanger of this invention shown attached to a support rod and supporting a pipe (shown in phantom) in generally horizontal position;

FIG. 2 is a right side elevation of FIG. 1;

FIG. 3 is an enlarged vertical section taken on line 3—3 of FIG. 2;

FIG. 4 is a front elevational view of the hanger in an initial position prior to application of the hanger to a pipe or conduit;

FIG. 5 is a view similar to FIG. 1 of another alternative hanger of this invention;

FIG. 6 is a right side elevation of FIG. 5;

FIG. 7 is an enlarged vertical section taken on line 7—7 of FIG. 6;

FIG. 8 is an enlarged plan of FIG. 5; and

FIG. 9 is a view similar to FIG. 4, showing the alternative hanger in an initial position prior to application of the hanger to a pipe or conduit.

Corresponding reference characters indicate corresponding parts throughout the several views of the drawings.

DESCRIPTION OF PREFERRED EMBODIMENTS

Referring now to the drawings, particularly to FIGS. 1–4, an improved hanger of this invention is indicated in its entirety at 1 and is shown suspending a pipe or conduit 3 in a generally horizontal position. The hanger is attached in a manner to be more fully explained hereinafter to a threaded support rod 5 which depends vertically from a structural member 7, such as a steel I-beam.

More specifically, hanger 1 comprises a support member constituted by a U-shaped strap 9 of relatively resilient material (e.g., 16-gauge hot-rolled steel) engageable with the undersurface of the pipe 3 and having a pair of legs which extend upwardly at opposite sides of the pipe, the left leg as viewed in FIG. 1 being designated 11 and the right leg 13. The upper ends of legs 11, 13 are bent laterally inwardly toward one another to form upper and lower generally horizontal overlapping flanges designated 15 and 17, respectively, which overlie the pipe. As shown best in FIG. 3, each flange has a central circular opening 19 therein for receiving the support rod 5 therethrough. The outer (right) end of the upper flange 15 is bent downwardly to form a lip 21 which extends down on the outside of the right leg 13. The outer (left) end of the lower flange 17 is also bent downwardly, forming a lip 23 adjacent the left leg 11 of the support member and spaced from the right leg 13. The function of these lips 21, 23 will be explained later.

In accordance with this invention, a relatively thin flat circular nut 25 with opposing upper and lower faces is held captive but rotatable with respect to strap 9 in a generally horizontal position with the upper face of the nut immediately adjacent to and below the lower flange 17. The nut has a threaded hole 27 through it extending from one face to the other and generally in register with the opening 19 in the lower flange 17 for threadably receiving the support rod thereby to attach the hanger to the rod. The nut is held rotatably captive in the position shown in FIG. 3 by retaining means comprising a thin metal retaining plate 29, preferably rectangular in shape, extending between the legs 11, 13 of the support member immediately below the nut, the latter thus being sandwiched between the retaining plate and the lower flange. A pair of tabs, each designated 31, at opposite sides of the retaining plate are receivable in relatively small opposed openings 33 in lip 23 and leg 13 to mount the retaining plate between the legs of the support member.

As shown in FIG. 3, the nut 25 has a portion 35 thereof rotatable in a circular opening 37 in the retaining plate. More particularly, it will be seen that the bottom face of the nut is deformed downwardly around threaded hole 27 thereby providing the aforesaid portion 35 rotatable in the retaining plate opening 37. It will be apparent, therefore, that nut 25 is held captive but rotatable with respect to support member 9 so that the nut cannot become separated from the support member. To facilitate rotation of nut 25, its peripheral edge is rough (e.g., knurled or serrated), as indicated at 39.

The hanger of this invention may quickly and easily be applied to a pipe or conduit and then attached to a support rod, such as rod 5. In this regard, the hanger is applied when in the position shown in FIG. 4. In this position, which shall be referred to as the "initial" position, the legs 11, 13 of the hanger are spaced relatively far apart for easy application of the hanger to pipe 3, and the upper flange 15 is sprung upwardly, being held in this sprung or flexed position by the engagement of lip 21 with the lower flange 17. After the hanger is in place around the pipe, the legs (which, as mentioned above, are resilient) are sprung together from the FIG. 4 position to a "final" position (FIGS. 1–3) in which the upper ends of the legs are closer together snug against opposite sides of the pipe and the flange openings 19 are in register for receiving the support rod therethrough. Lip 21 at the outer (right) end of the upper flange 15 constitutes means for maintaining and holding the support member in this final position so as to facilitate application of the hanger to rod 5. Thus, when the support member is moved to its final position the upper flange 15 and lip 21 automatically spring or snap downwardly, with the lip assuming a position on the outside of the right leg 13 of the support member to hold the latter in its final position. It will be noted that the abutment of lip 23 against leg 11 limits how far legs 11, 13 may be squeezed together. The nut is then threaded onto the support rod to attach the hanger and pipe to the rod. Inasmuch as the openings 19 are automatically held in alignment during this process, application of the hanger to the rod is facilitated and may in fact be accomplished using only one hand. The elevation of the pipe may be adjusted by threading nut 25 up and down on the support rod.

A locknut 41, which had been threaded up on rod 5 prior to attachment of the hanger to the rod, is then threaded down on the rod against the upper flange 15 and tightened to clamp both flanges 15, 17 down against the top face of the nut. This not only locks the hanger at the desired elevation, it also increases the load-holding capacity of the hanger by clamping the two flanges together. To ensure that the locknut 41 remains tightened down against the flanges, its bottom face is preferably serrated for biting into upper flange 15.

Referring now to FIGS. 5–9, an alternative hanger of this invention is designated in its entirety at 1a, to distinguish it from hanger 1 shown in FIGS. 1–4. The part of hanger 1a identical to parts of hange R 1 are given the same reference character with the addition of the letter "a". Hanger 1a is designed for smaller diameter pipe or conduit and is essentially identical to hanger 1 except that nut 25a is not held captive with respect to support member 9a by means of a retaining plate mounted below the nut. Rather, the periphery of the nut 25a is rotatably received in a pair of opposing slots 43, 45 in lip 23a and leg 13a, respectively. The means for holding the hanger in its final position is also different. The holding means of hanger 1a comprises a small tab 47 (comparable to lip 21 of hanger 1) extending downwardly from the upper flange 15a at the outer (right) end thereof. This tab is adapted to spring down into the upper portion of slot 45 above nut 25a when the legs 11a, 13a are squeezed together to hold flanges 15a, 17a in a position in which the openings 19a are in register. The application of hanger 1a to a pipe or conduit and the attachment of the hanger to a support rod are accomplished in the same manner described above in reference to hanger 1.

In view of the foregoing, it will be readily apparent that the fasteners 1, 1a of this invention are constructed in such a way that the component parts of the hangers cannot become separated and lost during shipping and handling in the field. Moreover, the hangers may quickly and easily be applied to a pipe or conduit and then attached to a support rod, such as the one designated 5 in the drawings. It will also be observed that the hangers of this invention are inexpensive to produce, especially since the nuts 25, 25a are relatively thin and flat and thus can readily be formed in a stamping operation.

In view of the above, it will be seen that the several objects of this invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A hanger adapted to be attached to a vertically disposed threaded support rod or the like for supporting a pipe or the like in a generally horizontal position, said hanger comprising a support member of relatively resilient material engageable with the undersurface of said pipe and having a pair of legs adapted to extend upwardly at opposite sides of the pipe, the upper ends of the legs being bent laterally inwardly toward one another to form upper and lower generally horizontal overlapping flanges adapted to overlie said pipe, each flange having an opening therein for receiving said support rod therethrough, a nut underlying the lower flange adapted to be threaded onto said support rod when the latter is received through said flange openings for attachment of the hanger to the rod, and retaining means below the lower flange engageable with the nut for holding it rotatably captive with respect to the lower flange thereby to prevent separation of the nut from the support member prior to and during attachment of the hanger to the support rod.

2. A hanger as set forth in claim 1 wherein the legs of the support member are adapted to be sprung together from an initial position in which the upper ends of the legs are spaced relatively far apart for application of the hanger to the pipe, to a final position in which the upper ends of each leg are closer together and said flange openings are in register for receiving said support rod therethrough, said hanger having means for holding the legs in said final position when the legs are sprung together.

3. A hanger as set forth in claim 1 wherein said nut is relatively thin and generally circular in shape and said retaining means comprises a lip extending downwardly from the outer free end of said lower flange of a respective leg generally parallel to and spaced from said respective leg, said lip and said respective leg having opposed slots therein with the periphery of said nut being rotatably received in the slots.

4. A hanger as set forth in claim 1 wherein said retaining means extends below said nut and adjacent thereto, said nut and said retaining means being interengageable for holding the nut captive with respect to said lower flange.

5. A hanger as set forth in claim 4 wherein the outer free end of said lower flange of a respective leg is bent to form a downwardly extending lip spaced from said respective leg, said retaining means extending between said lip and said respective leg generally parallel to said lower flange.

6. A hanger as set forth in claim 5 wherein said retaining means comprises a retaining plate having a circular opening therein, a portion of said nut being rotatable in the opening.

7. A hanger as set forth in claim 6 wherein said lip and said respective leg have opposed openings therein, and said retaining plate has tabs at opposite sides thereof receivable in said openings.

8. A hanger as set forth in claim 6 wherein the bottom face of the nut is deformed downwardly providing said portion of the nut rotatable in said retaining plate opening.

9. A hanger as set forth in claim 2 wherein said holding means comprises a downwardly extending lip at the outer free end of the upper flange of a respective leg, said lip being adapted to spring down on the outside of the other leg when the legs are moved to said final position thereby to hold said legs in said final position.

10. A hanger as set forth in claim 2 wherein said holding means comprises an opening in one of said flanges and a tab receivable in the opening on the other of said flanges, said tab being adapted to spring into said opening when the legs are moved to said final position thereby to hold the legs in said final position.

11. A hanger as set forth in claim 10 wherein the tab is on the upper flange and the opening is in the lower flange.

12. A hanger as set forth in claim 1 wherein said hanger further comprises a locknut threadable on said support rod down against said upper flange.

13. A hanger as set forth in claim 1 wherein said support member comprises a generally U-shaped strap of relatively resilient thin-gauge steel.

14. A hanger as set forth in claim 1 wherein said nut is relatively thin and generally circular in shape.

15. A hanger as set forth in claim 14 wherein the peripheral edge of the nut is rough for facilitating rotation thereof.

16. A hanger adapted to be attached to a vertically disposed threaded support rod or the like for supporting a pipe or the like in a generally horizontal position, said hanger comprising a support member engageable with the undersurface of said pipe and having a pair of legs adapted to extend upwardly at opposite sides of the pipe, the upper ends of the legs being bent laterally inwardly toward one another to form upper and lower generally horizontal overlapping flanges adapted to overlie said pipe, each flange having an opening therein for receiving said support rod therethrough, a relatively thin flat nut having upper and lower faces and a threaded hole therethrough extending from one face to the other, retaining means engageable with the nut for holding it captive but rotatable with respect to the support member below the lower flange with the upper face of the nut immediately adjacent the lower flange and the hole through the nut in register with the opening in the lower flange, the legs of the support member being adapted to be moved together from an initial position in which the upper ends of the legs are spaced relatively far apart for application of the hanger to the pipe, to a final position in which the upper ends of each leg are closer together and said flange openings are in register for receiving said support rod therethrough whereby said nut may be threaded onto said support rod for attachment of the hanger to the rod, said retaining means serving to prevent separation of the nut from the support member prior to and during attachment of the hanger to the rod.

17. A hanger as set forth in claim 16 wherein said nut is generally circular in shape and said retaining means comprises a lip extending down from the outer free end of said lower flange of a respective leg generally parallel to and spaced from said respective leg, said lip and said respective leg having opposed slots therein with the periphery of said nut being rotatably received in the slots.

18. A hanger as set forth in claim 16 wherein said retaining means extends below said nut and adjacent thereto, said nut and said retaining means being interengageable for holding the nut captive with respect to said lower flange.

19. A hanger as set forth in claim 18 wherein the outer free end of said lower flange of a respective leg is bent to form a downwardly extending lip generally parallel to and spaced from said respective leg, said retaining means extending between said lip and said respective leg generally parallel to said lower flange 20. A hanger as set forth in claim 19 wherein said retaining means comprises a retaining plate having a circular opening therein, a portion of said nut being rotatable in the opening.

21. A hanger as set forth in claim 20 wherein said lip and said respective leg have opposed openings therein, and said retaining plate has tabs at opposite sides thereof receivable in said openings.

22. A hanger as set forth in claim 20 wherein the bottom face of the nut is deformed downwardly around said hole in the nut thereby providing said portion of the nut rotatable in said retaining plate opening.

23. A hanger as set forth in claim 16 wherein said support member is of relatively resilient material, said legs being adapted to be sprung together from said initial to said final position, said hanger further comprising means for holding said legs in said final position when the legs are sprung together.

24. A hanger as set forth in claim 23 wherein said holding means comprises a downwardly extending lip at the outer free end of the upper flange of a respective leg, said lip being adapted to spring down on the outside of the other leg when the legs are moved to said final position thereby to hold said legs in said final position.

25. A hanger as set forth in claim 23 wherein said holding means comprises an opening in one of said flanges and a tab receivable in the opening on the other of said flanges, said tab being adapted to spring into said opening when the legs are moved to said final position thereby to hold the legs in said final position.

26. A hanger as set forth in claim 25 wherein the tab is on the upper flange and the opening is in the lower flange.

27. A hanger as set forth in claim 16 wherein said hanger further comprises a locknut threadable on said support rod down against said upper flange.

28. A hanger as set forth in claim 16 wherein said support member comprises a generally U-shaped strap of relatively resilient thin-gauge steel.

29. A hanger as set forth in claim 16 wherein said nut is generally circular in shape and has a peripheral edge which is rough for facilitating rotation of the nut.

* * * * *